Dec. 14, 1926.
B. Q. JONES
1,610,553
GOGGLES
Filed Oct. 31, 1924
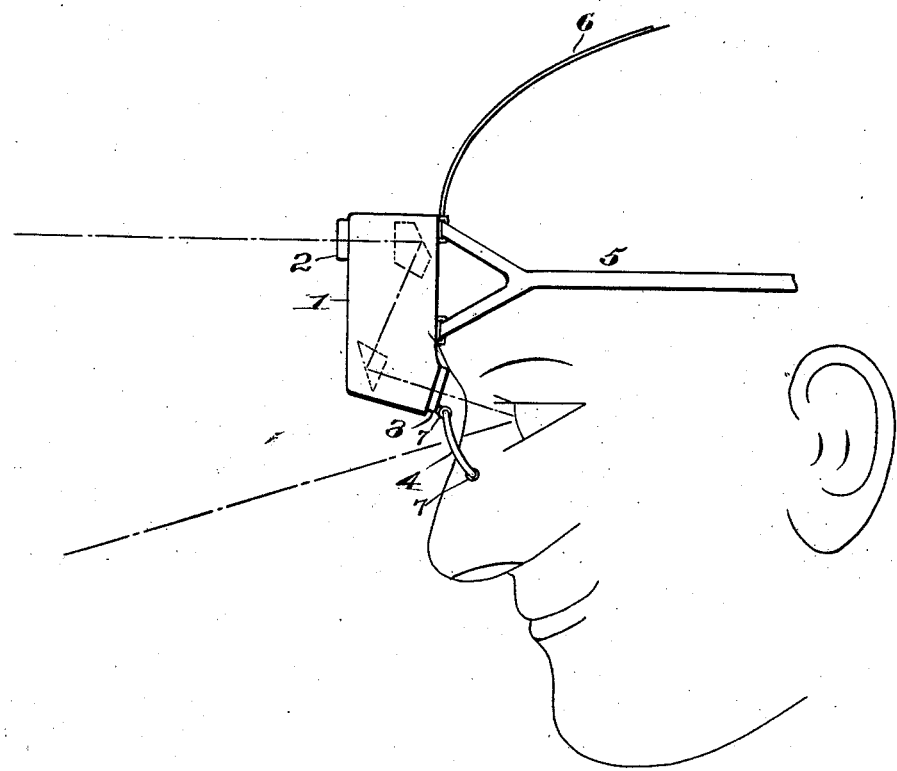
Inventor
B Q Jones Patented Dec. 14, 1926.

1,610,553

UNITED STATES PATENT OFFICE

BYRON Q. JONES, OF WASHINGTON, DISTRICT OF COLUMBIA.

GOGGLES.

Application filed October 31, 1924. Serial No. 746,997.

This invention relates to goggles in general, the broad object in view being to provide a goggle that can be mounted upon the head of an observer in such a way as to enable him to exercise direct vision or telescopic vision upon an object by simply moving his eye.

Another object of the invention is to provide a goggle that will provide both direct and telescopic vision, and at the same time protect the eye against an air blast.

With the above and other objects in view the invention consists in the novel construction, combination and arrangement herein fully described, illustrated and claimed.

The accompanying drawing shows a profile view of an observer with the goggle mounted upon his forehead in such a manner that he normally exercises direct vision through a non-magnifying lens, and when he desires he can elevate his eye slightly and obtain telescopic vision of the same object.

Now referring to the drawing, it will be seen that it is an application of the principles herein applied wherein upon the head of an observer is mounted a compact telescope 1 provided with object lenses 2 and ocular lenses 3 in such manner that the normal line of vision of the observer passes under the telescope. Now, to this telescope is attached non-magnifying lenses 4, held in frame 7 attached to telescope 1. Straps 5 and 6 show a means for attaching the device to the head of the observer. Now it is apparent that the eye of the observer can be readily protected against an air blast, or other agency, since non-magnifying lenses 4 and telescope 1 are interposed between the eyes and the agent. Also it is apparent that the eyes of the observer can be protected against injurious light by providing a suitable type of lenses 4, which correspond to those of the well-known goggle.

The construction above described comprises a combination of a pair of goggles and a telescope, a combination whose utility will be well appreciated especially in aeronautics, as in my device the lenses 4 protect the eyes while the pilot or observer, by merely shifting his line of vision, may readily use the telescope.

The compactness and novel means of attachment of the combined telescope and goggle is also an important feature of the invention.

I claim:

1. In an optical device the combination with a goggle of a telescope and means for mounting same upon the head of an operator in such a manner as to allow him to obtain two different views of an object by shifting his line of vision to either the goggle or the telescope, the eye of the operator in either case being protected by the goggle.

2. In an optical device the combination with a non-magnifying lens of a telescope and means for mounting same upon the head of an operator in such a manner as to allow two different views of an object by shifting his line of vision, the normal view being unmagnified, the other view being magnified.

3. In an optical device the combination with a non-magnifying lens of a telescope and means for mounting same upon the head of an operator in such a manner as to allow two different views of an object by shifting his line of vision, the normal view being unmagnified, the other view being magnified, said non-magnifying lens being adapted to provide a means of protection for the eye.

4. In combination, in a bifold vision optical device, a head harness, a telescope mounted in said harness, and a non-magnifying lens mounted in said harness below said telescope.

5. In combination, in a bifold vision optical device, a head harness, a telescope mounted in said harness, and a non-magnifying lens mounted in said harness below said telescope, said telescope and said non-magnifying lens being mounted in said harness in such a manner as to protect the eyes of the wearer.

In testimony whereof I affix my signature.

BYRON Q. JONES.